(12) United States Patent
Zou et al.

(10) Patent No.: US 8,929,272 B2
(45) Date of Patent: Jan. 6, 2015

(54) RELAY METHOD OF WIRELESS ACCESS SYSTEMS AND BASE STATION, RELAY DEVICE AND REPLAY SYSTEM THEREOF

(75) Inventors: Wei Zou, Shanghai (CN); Gang Shen, Shanghai (CN); Jiang Qi, Shanghai (CN); Jimin Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1116 days.

(21) Appl. No.: 12/298,210

(22) PCT Filed: Apr. 27, 2007

(86) PCT No.: PCT/CN2007/001418
§ 371 (c)(1),
(2), (4) Date: Oct. 23, 2008

(87) PCT Pub. No.: WO2007/128219
PCT Pub. Date: Nov. 15, 2007

(65) Prior Publication Data
US 2009/0097433 A1    Apr. 16, 2009

(30) Foreign Application Priority Data

Apr. 27, 2006  (CN) .......................... 2006 1 0026142

(51) Int. Cl.
*H04B 7/14* (2006.01)
*H04B 7/26* (2006.01)
*H04B 7/155* (2006.01)

(52) U.S. Cl.
CPC .............. *H04B 7/2606* (2013.01); *H04B 7/155* (2013.01)
USPC ....................................................... 370/315

(58) Field of Classification Search
CPC .............................. H04B 7/155; H04B 7/2606
USPC .............. 370/310, 315; 375/211; 455/7, 11.1, 455/12.1, 13.1
See application file for complete search history.

(56) References Cited

U.S. PATENT DOCUMENTS 7,599,341 B2 * 10/2009 Ramachandran ............. 370/338
2004/0192204 A1    9/2004 Periyalwar et al.
(Continued)

FOREIGN PATENT DOCUMENTS

CN    1252650 A    5/2000
CN    1691645 A    11/2005
(Continued)

OTHER PUBLICATIONS

International Search Report for Application No. PCT/CN2007/001418.
(Continued)

*Primary Examiner* — Chi Pham
*Assistant Examiner* — Robert Lopata
(74) *Attorney, Agent, or Firm* — Fay Sharpe LLP

(57) ABSTRACT

The present invention is directed to provide a relay method in a wireless access system, including comprising the following steps: in downlink direction, receiving downlink data from a base station, wherein the downlink data include control information for relay operation; constructing downlink data to be retransmitted; retransmitting the constructed downlink data to wireless communication terminals according to a profile specified by the control information; and, in uplink direction, receiving uplink data from the wireless communication terminals according to a profile specified by the control information; recovering the uplink data of the wireless communication terminals; and retransmitting the uplink data to the base station according to the profile specified by the control information. The present invention further provides the corresponding base station device, relay device and wireless relay system. Through the present invention, the base station is able to perform centralized control of the entire mobile multi-hop relay system, which effectively reduces the complexity of the relay device and can realize a transparent transportation with respect to wireless communication terminals.

19 Claims, 7 Drawing Sheets

(56) References Cited

U.S. PATENT DOCUMENTS

| | | | |
|---|---|---|---|
| 2005/0159163 A1 | 7/2005 | Chang et al. | |
| 2005/0232183 A1* | 10/2005 | Sartori et al. | 370/319 |
| 2007/0060050 A1* | 3/2007 | Lee et al. | 455/13.1 |
| 2007/0110016 A1* | 5/2007 | Shen et al. | 370/338 |
| 2007/0249347 A1* | 10/2007 | Saifullah et al. | 455/436 |
| 2008/0285499 A1* | 11/2008 | Zhang et al. | 370/315 |
| 2008/0285500 A1* | 11/2008 | Zhang et al. | 370/315 |
| 2008/0285501 A1* | 11/2008 | Zhang et al. | 370/315 |
| 2009/0258639 A1* | 10/2009 | Nystrom et al. | 455/422.1 |

FOREIGN PATENT DOCUMENTS

| | | |
|---|---|---|
| EP | 1445876 A1 | 8/2004 |
| JP | 2001102988 A | 4/2001 |
| JP | 2002-0040897 | 5/2002 |
| JP | 2002-0067615 | 8/2002 |
| JP | 2005-0075240 | 7/2005 |
| KR | 20050009663 A | 1/2005 |
| WO | WO 01/33772 A1 | 5/2001 |
| WO | WO 02/43312 A2 | 5/2002 |

OTHER PUBLICATIONS

Esseling, Norbert, et al., "A Forwarding Concept for HiperLAN/2", Computer Networks, Elsevier Science, vol. 37, No. 1, Sep. 1, 2001, pp. 25-32.

European Search Report dated Jun. 4, 2014.

* cited by examiner

RELAY METHOD OF WIRELESS ACCESS SYSTEMS AND BASE STATION, RELAY DEVICE AND REPLAY SYSTEM THEREOF

FIELD OF THE INVENTION

The present invention generally relates to a wireless access system, and more specifically to a traffic relay method of wireless access systems and a base station, a relay device and a relay system using said method.

BACKGROUND OF THE INVENTION

Since the beginning of the 1990s, the broadband wireless access technology has been rapidly developed with the ever-increasing demand for wireless access, in particular, broadband wireless access. The Institute of Electrical and Electronics Engineers (IEEE) formed IEEE 802.16 task group specializing in the technical standardization of broadband fixed wireless access, and its objective is to establish a universal broadband wireless access standard. In order to achieve the above objective, some world famous enterprises have further initiated Worldwide Interoperability for Microwave Access (WiMAX) Forum aiming at popularizing said standard globally.

As the next-generation wireless broadband access technology, WiMAX (IEEE 802.16) boasts accessibility that parallels wire-line high-speed data access technology. It supports various traffics by providing line-of-sight (LOS) (using a spectrum of 10-66 GHz) or non-line-of-sight (NLOS) (using a spectrum of 2-11 GHz) wireless connections between a base station and a subscriber station, including real-time traffics that have high time delay requirements, such as voice and video. As WiMAX system works at a relatively high spectrum of above 2 GHz, it usually requires a line-of-sight propagation. Thus, the coverage of the WiMAX system is seriously limited, and it is more so in urban areas where buildings are densely distributed, and the complex radio propagation not only reduces the coverage, but also produces a lot of blind areas.

The Mobile Multi-hop Relay (MMR) is a task group newly formed in March 2006 by IEEE whose major task is to define the extension of IEEE 802.16 for multi-hop relay such that the WiMAX system supports mobile multi-hop relaying. The objective of mobile multi-hop relay is throughput enhancement or coverage extension of the system without affecting the subscriber equipment. It requires that all the amendments must be compatible with IEEE 802.16e and limited to the base station and the relay station, and no change is permitted on the IEEE 802.16e user equipment. As IEEE 802.16e merely involves the physical layer (PHY) and the media access control layer (MAC), the amendments can only be carried out in the above two layers. The project authorization requirement (PAR) of MMR task group clearly requires that: (1) the relay station (RS) should be transparent to subscriber equipment; (2) the RS should be significantly smaller than the base station; and (3) the multi-hop frame structure should be only orthogonal frequency division multiple access (OFDMA)-based. Currently, preliminary studies are carried out on the definition of frame structure, network entry flow, selection and handover of relay stations, handover between the relay station and the base station, control mapping information (MAP) transportation, and the method of reporting subscriber information by the relay station, etc. Technical solutions for both throughput enhancement and coverage extension of the system are included in the ultimate standardization.

FIGS. 1A and 1B depict basic scenarios of IEEE 802.16 relay, wherein FIG. 1A schematically shows a scenario of throughput enhancement, while FIG. 1B schematically shows a scenario of coverage extension, wherein the same numerals denote the same or similar devices. For the purpose of clarification, each figure merely shows a mobile station as an example of wireless communication terminal. It is seen that in practice, a plurality of wireless communication terminals may exist simultaneously in the scenario of throughput enhancement as shown in FIG. 1A or in the scenario of coverage extension as shown in FIG. 1B. Furthermore, the wireless communication terminal is not limited to mobile station, it may also be all kinds of terminal devices which are equipped with wireless communication function, such as a personal digital assistant (PDA), a beeper, a laptop, or a portable device.

In the scenario of throughput enhancement as shown in FIG. 1A, a mobile station (MS) 103 as an example of wireless communication terminal is located within the coverage of a base station (BS) 101, and it can directly receive information broadcast by the base station 101. However, the traffic between the mobile station 103 and the base station 101 can also be forwarded through a relay station (RS) 102. It has been proved that access to the wireless communication terminal by this approach can effectively enhance the throughput of the system under certain circumstances.

In the scenario of coverage extension as shown in FIG. 1B, a mobile station 103 as an example of wireless communication device is located out of the coverage of a base station 101 and it cannot directly receive all the control information broadcast by the base station 101. Compared with conventional wireless communication terminals, a relay station 102 may have a high transmit power and a high receiving sensitivity. Hence, it is able to establish sound connection with the base station. Therefore, the mobile station 103, which is located within the coverage of the relay station 102 and out of the coverage of the base station 101, can accomplish traffic transportation with the base station 101 through the relay station 102.

Although IEEE 802.16 has depicted two application scenarios of a mobile multi-hop relay (MMR) system, so far it merely proposed the fact that the relay station should be able to relay all kinds of uplink and downlink traffics. As for the multi-hop relay system of WiMAX, the important problem to be solved lies in: how to relay traffic between the base station and the wireless device, and how to control the relay process.

SUMMARY OF THE INVENTION

The object of the present invention is to provide basic solutions for traffic relay and control of WiMAX multi-hop relay system with respect to the technical problems yet to be solved in the prior art.

According to one aspect of the present invention, a relay method in a wireless access system is provided, including the following steps: in downlink direction, receiving downlink data from a base station, wherein the downlink data include control information for relay operation; constructing downlink data to be retransmitted; retransmitting the constructed downlink data to wireless communication terminals according to a profile specified by the control information; and, in uplink direction, receiving uplink data from the wireless communication terminals according to the profile specified by the control information; recovering the uplink data of the wireless communication terminals; and retransmitting the uplink data to the base station according to the profile specified by the control information.

According to another aspect of the present invention, a base station device is provided, comprising: transmitting means, for transmitting downlink data to a relay station, transmission processing means, for adding control information for controlling the relay operation to the downlink data to be transmitted; and receiving means, for receiving the uplink data retransmitted by the relay station.

According to another aspect of the present invention, a relay device is provided, comprising: downlink receiving means, for receiving downlink data from the base station, wherein the downlink data include control information for relay operation; downlink processing means, for constructing downlink data to be retransmitted; downlink transmitting means, for retransmitting the constructed downlink data to wireless communication terminals according to a profile specified by the control information; uplink receiving means, for receiving uplink data from the wireless communication terminals according to the profile specified by the control information; uplink processing means, for recovering uplink data of the wireless communication terminals; and uplink transmitting means, for retransmitting uplink data to the base station according to the profile specified by the control information.

According to still another aspect of the present invention, a wireless relay system is provided, comprising the base station device according to the present invention and the relay device according to the present invention.

The present invention provides solutions of relay process for the existing IEEE 802.16 mobile multi-hop relay (MMR) system. Through the present invention, the base station is able to perform centralized control of the entire mobile multi-hop relay system, which effectively reduces the complexity of the relay device and can realize a transparent transportation with respect to wireless communication terminals. Furthermore, according to the embodiments of the present invention, the relay device is able to control the communication operation of the wireless communication terminals by merely copying a transmission or constructing MAP information in the scenario of coverage extension, which effectively solves the problem of control information delivery when the wireless communication terminals are located out of the coverage of the base station in a simple manner.

The other features and advantages of the present invention will be more apparent from the following detailed description taken in conjunction with the accompanying drawings.

DESCRIPTION OF THE PREFERRED EMBODIMENTS

Figure 1A:
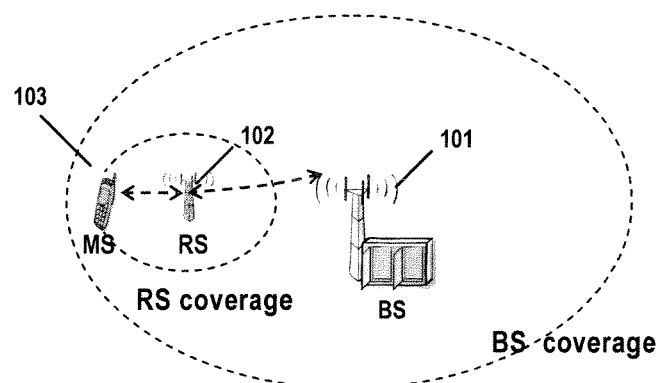
FIGS. 1A and 1B depict basic scenarios of IEEE 802.16 relay, wherein FIG. 1A schematically shows a scenario of throughput enhancement, while FIG. 1B schematically shows a scenario of coverage extension.

The present invention is described with reference to the accompanying drawings, wherein the same reference numerals denote the same or similar devices throughout the text.

Figure 1B:
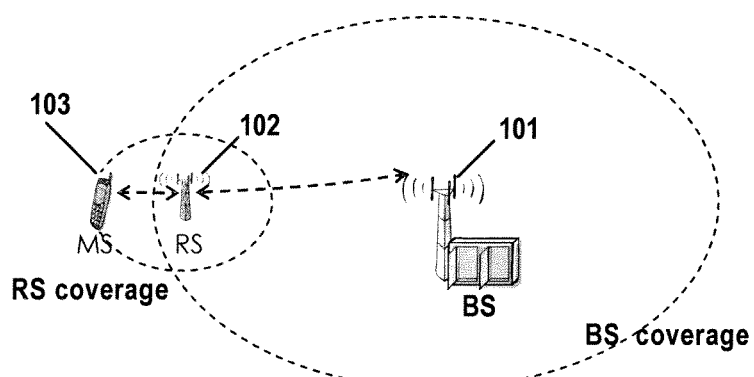

FIGS. 1A and 1B show basic scenarios of IEEE 802.16 relay, which has been depicted in the Background of Invention.

According to the present invention, in the scenarios of IEEE 802.16 relay, i.e. the scenario of throughput enhancement as shown in FIG. 1A and/or the scenario of coverage extension as shown in FIG. 1B, all the control and scheduling functions can be performed by the base station. The base station is responsible for allocating bandwidth resources for uplink and downlink traffics for the relay station and the wireless communication terminals serving as subscribers (such as the mobile stations), and coordinating communications between the relay station and the mobile stations. This centralized control method can significantly reduce the complexity of the relay station and reduce the cost thereof. Since line-of-sight transmission channels are provided between the base station and the relay station the communication quality between the relay station and the base station can be ensured.

In the scenario of throughput enhancement, the wireless communication terminal is located within the coverage of the base station, and it can directly receive all the control information broadcast by the base station. Therefore, preferably, the relay station is able to forward (relay) traffic between the base station and the wireless communication terminal to enhance the throughput of the system. Hence, the complexity of the relay station in said scenario could be significantly reduced.

In the scenario of coverage extension, the wireless communication terminal is located out of the coverage of the base station, and it cannot receive all the control information broadcast by the base station. Therefore, the relay station must not only be able to relay traffic data but also to relay and generate necessary base station control information, which includes downlink preamble signal and necessary mapping control information.

In order to better understand the technical solutions of the present invention, firstly the basic sequence of the traffic relay processing in the relay system is explained with reference to FIG. 2.

Figure 2:
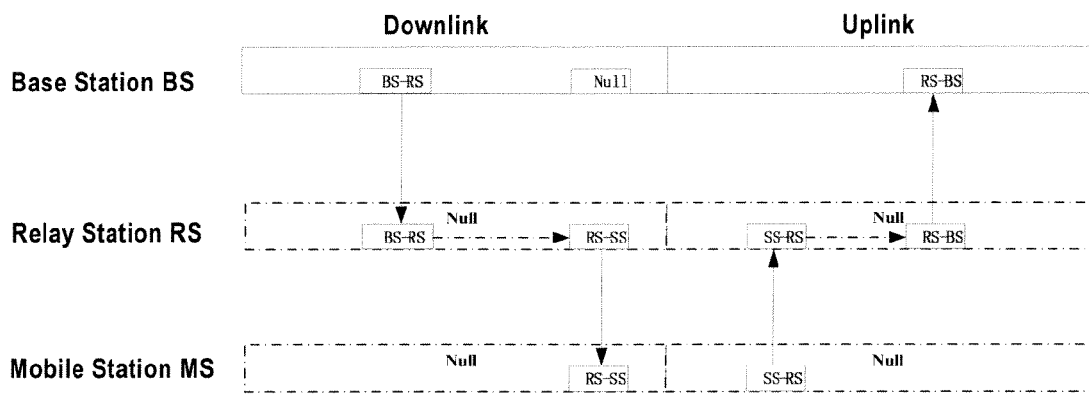
FIG. 2 shows an example of the basic sequence of traffic relay processing in a relay system.

As shown in FIG. 2, in downlink direction, the base station firstly transmits the traffic to be relayed to the relay station, and then the relay station transmits it to the wireless communication terminal, and the two transmissions are both carried out with one downlink sub-frame. In uplink direction, the relay station firstly receives the traffic of the wireless communication terminal, and then transmits it to the base station. Similarly, the two uplink transmissions are centralized in the same uplink sub-frame. By such a scheduling method, all traffics can be transported to the base station or the wireless communication terminal in the period of one frame, and thus it can effectively support all kinds of real-time services. Since both the base station and the relay station use the same spectrum, the base station must allocate independent resources for the transmitting and receiving actions of the relay station. Here, the relay station can be regarded as a conventional wireless communication device located within the coverage of the base station, and it performs data transmitting and receiving actions according to the scheduling of the base station.

Although the time periods and the sub-carrier bands of downlink transmission and the uplink receiving of the relay station can be clearly specified in the mapping information of the downlink broadcast, the relay station may per or different operations in said time periods or sub-carrier bands. For instance, the relay station may carry out the transmission in QPSK in one of the time periods, while carry out the transmission in 64 QAM in another time period. To facilitate the overall control of the operations of the relay station, the present invention proposes to control the operations of the relay station using relay station mapping information (RS MAP information), including the reception and retransmission of uplink and downlink traffics. The relay station mapping information may have a format which is the same as or similar to that of the base station mapping information, whereas it may not include the downlink control description (DCD) and the uplink control description (UCD) information, and it further includes two parts, namely, relay station uplink mapping (RS UL-MAP) information and relay station downlink mapping (RS DL-MAP) information. Wherein RS DL-MAP controls the retransmission of downlink traffic by the relay station, while RS UL-MAP controls the reception of uplink traffic by the relay station.

Figure 3:
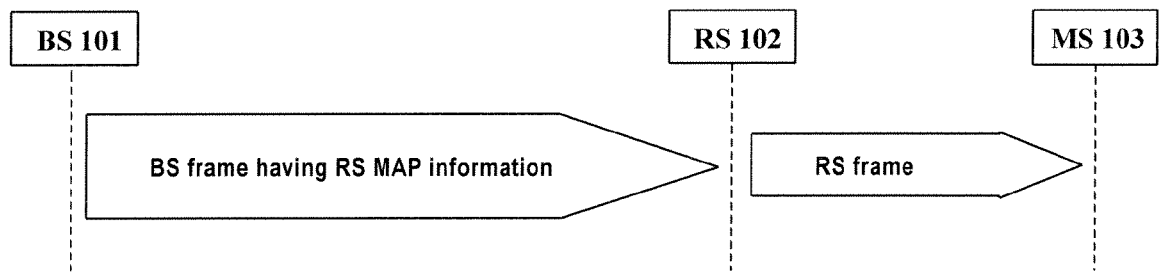
FIG. 3 schematically shows the delivery process of relay control information according to an embodiment of the present invention.

FIG. 3 schematically shows the transportation process of relay control information according to an embodiment of the present invention.

Since all the control actions are centralized in the base station 101 in a multi-hop relay system, the content of the relay station mapping information is generated and transmitted to the relay station 102 by the base station 101 serving as a controller and a resource allocation means. As for the scenario of coverage extension, the relay station 102 needs to reconstruct or copy the relay station mapping information transmitted by the base station 101 and transmit it, together with other necessary control information, such as preamble signals to the wireless communication terminals, such as the mobile station 103, so as to control the operations thereof. As for the scenario of throughput enhancement, although the relay station 102 does not need to broadcast special mapping information to the mobile station 103, the base station 101 must transmit the relevant control information to the relay station 102 such that it is aware of how to perform the following receiving and retransmission actions.

There are various manners of transmitting control information. It can be included in the base station mapping information as a normal part or a specific part thereof, or be transmitted through a dedicated MAC layer management message. Specially, in the scenario of coverage extension, if the relay station mapping information has the same format as the base station mapping information, and it is intact mapping information, the relay station 102 can directly broadcast it without any processing. It is especially advantageous to simplify the relay station in the scenario of coverage extension. On the other hand, if the relay station mapping information and the base station mapping information have different formats, for instance, the relay station mapping information merely includes mapping information relevant to the relay station, the relay station 102 needs to construct mapping information to be transmitted to the mobile station 103 by itself, and broadcast it to the wireless communication terminal to be controlled, such as the mobile station 103. However, even if the relay station 102 needs to construct mapping information per se, according to the present invention, the content in the newly constructed mapping information also comes from the base station 101. That is to say, generally, the base station 101 still performs centralized control and scheduling functions for the entire relay system.

A relay method of the wireless access system according to the present invention is described with reference to FIGS. 4-7. In the embodiments, three mobile stations 103-1, 103-2 and 103-3 are provided as examples of wireless communication terminals in the scenario of throughput enhancement or in the scenario of coverage extension. Those skilled in the art can appreciate that the relay methods in said two scenarios are basically similar except the differences described in the preceding text (i.e. the processing to the received mapping information is different, and in turn the corresponding processing of the mobile station is different). Therefore, for the purpose of conciseness, explanation is only provided for the corresponding distinctive steps where necessary.

Figure 4:
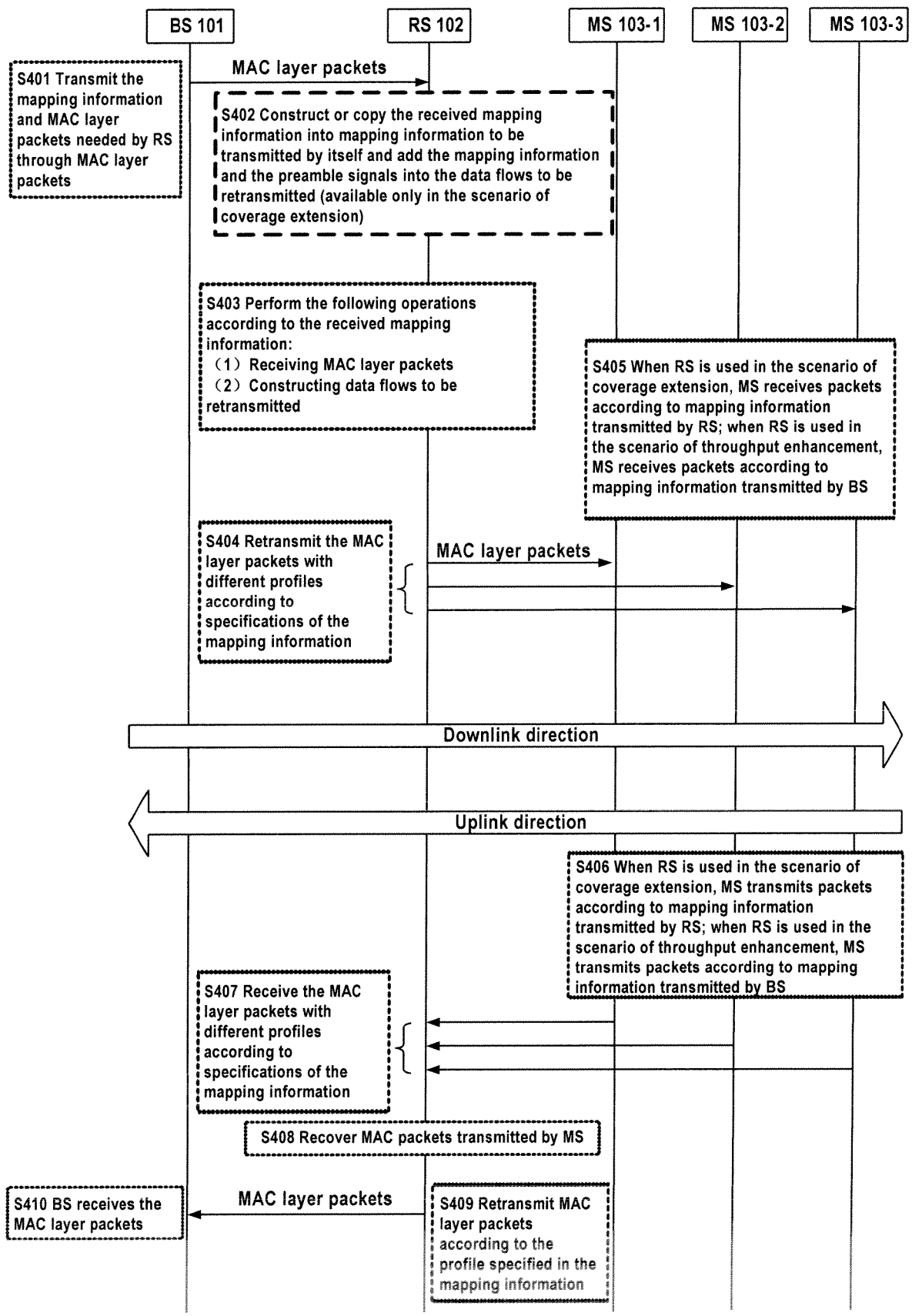
FIG. 4 shows a flow chart of a relay method of the wireless access system according to an embodiment of the present invention.

FIG. 4 shows a flow chart of a relay method of the wireless access system according to an embodiment of the present invention.

As shown in FIG. 4, in downlink direction, in step S401, the base station 101 transmits the control information needed by the relay station 102 through MAC layer packets, such as relay station mapping information, and MAC layer packets to be relayed. Step S402 is an alternative step. When the relay station 102 serves in the scenario of coverage extension, step S402 is performed. In step S402, the relay station 102 constructs or copies (depending on whether the formats of BS MAP and RS MAP are the same) the received mapping information into mapping information to be transmitted by itself, so as to put the mapping information and the preamble signals into the data flows to be retransmitted in constructing the data flows to be retransmitted.

In step S403, the relay station 102 performs the following operations according to the relay station mapping information received from the base station 101: receiving MAC layer packets transmitted by the base station 101; and constructing data flows to be retransmitted. Here, if the relay station 102 serves in the scenario of coverage extension, i.e. step S402 is performed preceding the present step, the mapping information and the preamble signals constructed or copied by the relay station 102 should be added to the constructed retransmission data flows.

In step S404, the relay station 102 retransmits the MAC layer packets to be relayed to the mobile stations 103-1, 103-2 and 103-3 respectively with different profiles according to the relay station mapping information received from the base station 101.

In step S405, the mobile stations 103-1, 103-2 and 103-3 receive packets relayed by the relay station 102. Wherein if the mobile stations 103-1, 103-2 and 103-3 are in the scenario of coverage extension, the mobile stations 103-1, 103-2 and 103-3 can only receive mapping information transmitted by the relay station 102, hence, receiving MAC layer packets according to the content of mapping information transmitted by the relay station 102. If the mobile stations 103-1, 103-2 and 103-3 are in the scenario of throughput enhancement, the mobile stations 103-1, 103-2 and 103-3 can only receive mapping information broadcast by the base station 101 (as stated above, the relay station 102 does not relay mapping information here), hence receiving MAC layer packets according to the content of mapping information transmitted by the base station 101.

In uplink direction, in step S406, the mobile stations 103-1, 103-2 and 103-3 transmit packets. Similarly, if the mobile stations 103-1, 103-2 and 103-3 are in the scenario of coverage extension, MAC layer packets are transmitted according to the content of mapping information transmitted by the relay station 102. If the mobile stations 103-1, 103-2 and 103-3 are in the scenario of throughput enhancement, MAC layer packets are transmitted according to the content of mapping information transmitted by the base station 101.

In step S407, the relay station 102 receives from the mobile stations 103-1, 103-2 and 103-3 MAC layer packets to be relayed with different profiles according to the specifications in the relay station mapping information transmitted by the base station 101.

In step S408, the relay station 102 recovers packets transmitted by the mobile stations. In step S409, the relay station 102 retransmits MAC layer packets of the mobile stations 103-1, 103-2 and 103-3 to the base station 101 according to the specifications in the relay station mapping information transmitted by the base station 101.

In step S410, the base station 101 receives the MAC layer packets of the mobile stations 103-1, 103-2 and 103-3 relayed by the relay station 102.

Those skilled in the art can appreciate that although steps S405 and S406 illustrate the processing of the mobile stations in two possible circumstances, the mobile stations 103-1, 103-2 and 103-3 cannot realize and do not need to realize which circumstance they are under. This is because the entire mapping information relaying process is the same as the relaying process of traffics, which is transparent to the mobile stations.

As depicted in FIG. 4, the relay method according to an embodiment the present invention realizes a quite direct relay method through operation at MAC layer packet level. In the embodiment, the relay station 102 directly retransmits all the received MAC layer packets without making any modification. This requires that the relay station 102 carry out individual processing to each of the received MAC layer packets, and the relay station 102 mapping information should include the profile adopted in downlink retransmission by the relay station 102, including coding and modulation manners, etc.; all the receiving profile of the uplink burst data blocks to be relayed, including coding and modulation manners, etc. In order to support retransmission at packet level, the control information in the relay station downlink mapping information (RS DL-MAP) must be detailed to the connection level, i.e. corresponding control information should be provided for different connections, respectively.

Figure 5:
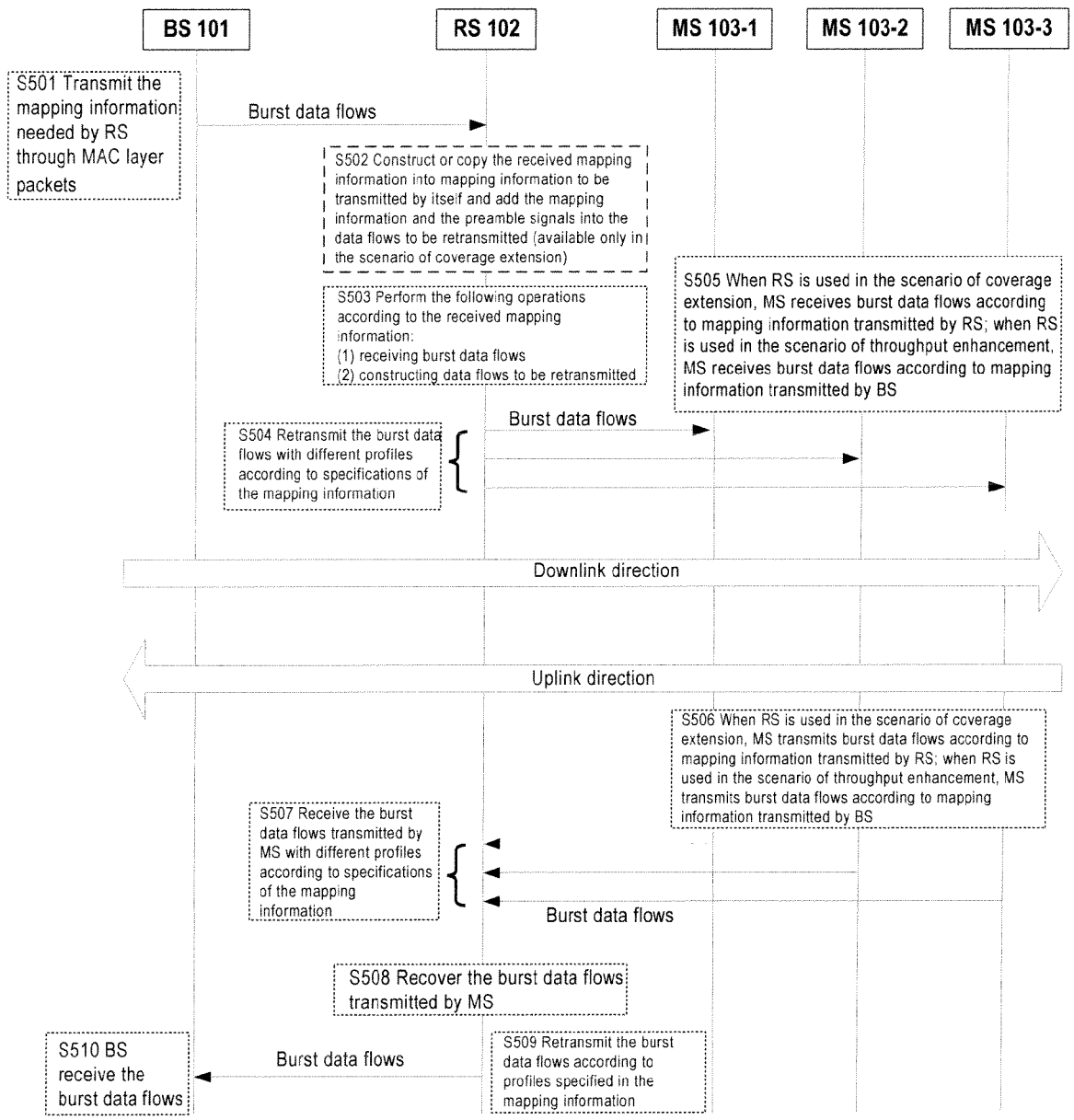
FIG. 5 shows a flow chart of a relay method of the wireless access system according to another embodiment of the present invention.

FIG. 5 shows a flow chart of a relay method of the wireless access system according to another embodiment of the present invention.

As shown in FIG. 5, in downlink direction, in step S501, the base station 101 transmits the control information needed by the relay station 102 through MAC layer packets, such as relay station mapping information. Then, the base station 101 transmits the MAC layer packet including the control information in the form of burst data flows. Step S502 is an alternative step. When the relay station 102 serves in the scenario of coverage extension, step S502 is performed. In step S502, the relay station 102 constructs or copies (depending on whether the formats of BS MAP and RS MAP are the same) the received mapping information into mapping information to be transmitted by itself, so as to put said mapping information and the preamble signals into the data flows to be retransmitted in constructing the retransmission data flow.

In step S503, the relay station 102 performs the following operations according to the relay station mapping information received from the base station 101: receiving burst data flows transmitted by the base station 101; and constructing data flows to be retransmitted. Here, if the relay station 102 serves in the scenario of coverage extension, i.e. step S502 is performed preceding the present step, the mapping information and the preamble signals constructed or copied by the relay station 102 should be added to the constructed retransmission data flows.

In step S504, the relay station 102 retransmits the burst data flows to be relayed to the mobile stations 103-1, 103-2 and 103-3 respectively with different profiles according to the relay station mapping information received from the base station 101.

In step S505, the mobile stations 103-1, 103-2 and 103-3 receive burst data flows relayed by the relay station 102. Wherein if the mobile stations 103-1, 103-2 and 103-3 are in the scenario of coverage extension, the mobile stations 103-1, 103-2 and 103-3 can only receive mapping information transmitted by the relay station 102, hence, receiving burst data flows according to the content of mapping information transmitted by the relay station 102. If the mobile stations 103-1, 103-2 and 103-3 are in the scenario of throughput enhancement, the mobile stations 103-1, 103-2 and 103-3 can only receive mapping information broadcast by the base station 101 (as stated above, the relay station 102 does not relay mapping information here), hence receiving burst data flows according to the content of mapping information transmitted by the base station 101.

In uplink direction, in step S506, the mobile stations 103-1, 103-2 and 103-3 transmit burst data flows. Similarly, if the mobile stations 103-1, 103-2 and 103-3 are in the scenario of coverage extension, burst data flows are transmitted according to the content of mapping information transmitted by the relay station 102. If the mobile stations 103-1, 103-2 and 103-3 are in the scenario of throughput enhancement, burst data flows are transmitted according to the content of mapping information transmitted by the base station 101.

In step S507, the relay station 102 receives from the mobile stations 103-1, 103-2 and 103-3 burst data flows to be relayed with different profiles according to the specifications in the relay station mapping information transmitted by the base station 101.

In step S508, the relay station 102 recovers burst data flows transmitted by the mobile stations.

In step S509, the relay station 102 retransmits burst data flows of the mobile stations 103-1, 103-2 and 103-3 to the base station 101 according to the specifications in the relay station mapping information transmitted by the base station 101.

In step S510, the base station 101 receives burst data flows of the mobile stations 103-1, 103-2 and 103-3 relayed by the relay station 102.

Those skilled in the art can appreciate that although steps S505 and S506 illustrate the processing of the mobile stations in two possible circumstances, the mobile stations 103-1, 103-2 and 103-3 cannot realize and do not need to realize which circumstance they are under. This is because the entire mapping information relaying process is the same as the relaying process of traffics, which is transparent to the mobile stations.

FIG. 5 depicts a relay method according to an embodiment of the present invention of re-transmitting the received burst data flows, wherein each burst data flow may include one or more MAC layer packets. In said method, although the relay station 102 receives all the arrived downlink burst data flows from the base station 101 with the same profile, the re-transmitting profile of the burst data flows may differ. Therefore, the base station 101 must specify the relevant control information in the relay station mapping information. Accordingly, the control information in the relay station downlink mapping information is only required to be detailed to the levels of the burst data flows to be retransmitted, i.e. corresponding control information should be provided for different burst data flows, respectively, such as different modulation manners, etc. Preferably, the base station 101 may transmit the burst traffics to the relay station 102 according to the order of the burst traffics existing in the relay station mapping information. Hence, after receiving said burst data flows, the relay station 102 can perform retransmission of the burst data flows according to the profiles in sequence without differentiating the burst data flows. The relay method according to the embodiment of the present invention can significantly reduce the amount of the control information needed through retransmission of the level of the burst data flows. Furthermore, as stated above, the burst data flows can be relayed directly without any modification, and the process is simple.

Furthermore, it should be noted that in order to differentiate the present embodiment from the transparent transportation based on the MAC layer packets as shown in FIG. 4, in FIG. 5, "burst data flows" signs with arrows having directions schematically represent the data transmission between the base station and the relay station, and between relay station and wireless communication terminals. However, those skilled in the art can appreciate that in practical transportation, the MAC layer packets should be transmitted in the form of burst data flows between the base station and the relay station and between the relay station and the wireless communication terminals. Therefore the signs merely schematically represent the processing aspect, which has nothing to do with the practical transportation process.

Figure 6:
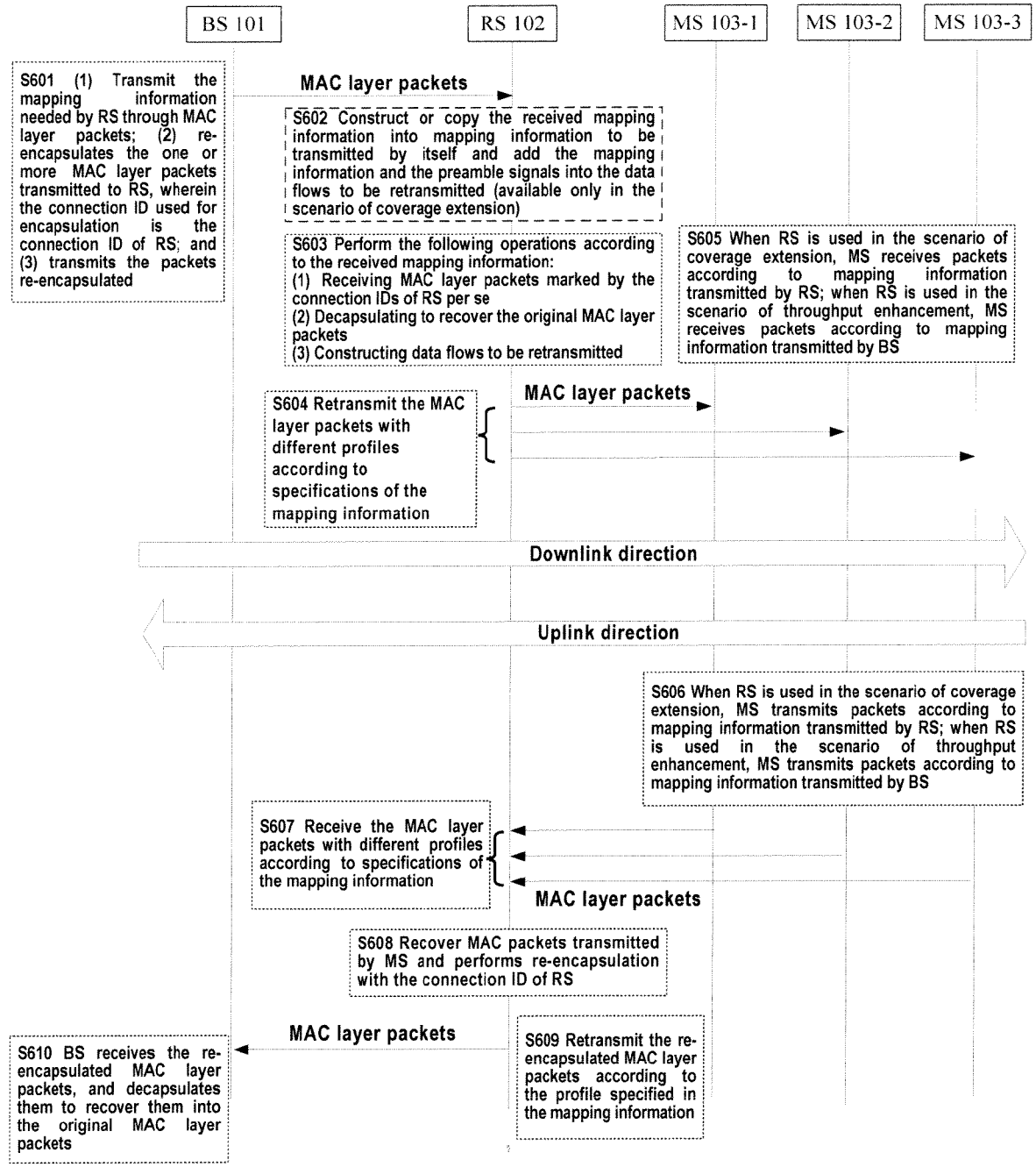
FIG. 6 shows a flow chart of a relay method of the wireless access system according to another embodiment of the present invention.

FIG. 6 shows a flow chart of a relay method of the wireless access system according to another embodiment of the present invention.

As shown in FIG. 6, in downlink direction, in step S601, the base station 101 transmits the control information needed by the relay station 102 through MAC layer packets, such as relay station mapping information. The one or more MAC layer packets transmitted to the relay station 102 are re-encapsulated; wherein the connection ID (CID) used for encapsulation is the connection ID for connection with the relay station. Then, the base station 101 transmits the packets re-encapsulated with the connection ID of the relay station.

Step S602 is an alternative step. When the relay station 102 serves in the scenario of coverage extension, step S602 is performed. In step S602, the relay station 102 constructs or copies (depending on whether the formats of BS MAP and RS MAP are the same) the received mapping information into mapping information to be transmitted by itself, so as to put said mapping information and the preamble signals into the data flow to be retransmitted in constructing the retransmission data flow.

In step S603, the relay station 102 performs the following operations according to the relay station mapping information received from the base station 101: receiving MAC layer packets identified by the connection ID of the relay station 102 per se and transmitted by the base station 101; decapsulating the MAC layer packets to recover the original MAC layer packets; and constructing data flows to be retransmitted. Here, if the relay station 102 serves in the scenario of coverage extension, i.e. step S602 is performed preceding the present step, the mapping information and the preamble signals constructed or copied by the relay station 102 should be added to said constructed retransmission data flows.

In step S604, the relay station 102 retransmits the MAC layer packets to be relayed to the mobile stations 103-1, 103-2 and 103-3 respectively with different profiles according to the relay station mapping information received from the base station 101.

In step S605, the mobile stations 103-1, 103-2 and 103-3 receive packets relayed by the relay station 102. Wherein if the mobile stations 103-1, 103-2 and 103-3 are in the scenario of coverage extension, the mobile stations 103-1, 103-2 and 103-3 can only receive mapping information transmitted by the relay station 102, hence, receiving MAC layer packets according to the content of mapping information transmitted by the relay station 102. If the mobile stations 103-1, 103-2 and 103-3 are in the scenario of throughput enhancement, the mobile stations 103-1, 103-2 and 103-3 can only receive mapping information broadcast by the base station 101 (as stated above, the relay station 102 does not relay mapping information here), hence receiving MAC layer packets according to the content of mapping information transmitted by the base station 101.

In uplink direction, in step S606, the mobile stations 103-1, 103-2 and 103-3 transmit packets. Similarly, if the mobile stations 103-1, 103-2 and 103-3 are in the scenario of coverage extension, MAC layer packets are transmitted according to the content of mapping information transmitted by the relay station 102. If the mobile stations 103-1, 103-2 and 103-3 are in the scenario of throughput enhancement, MAC layer packets are transmitted according to the content of mapping information transmitted by the base station 101.

In step S607, the relay station 102 receives from the mobile stations 103-1, 103-2 and 103-3 MAC layer packets to be relayed with different profiles according to the specifications in the relay station mapping information transmitted by the base station 101.

In step S608, the relay station 102 recovers MAC layer packets transmitted by the mobile stations and performs re-encapsulation with the connection ID of the relay station 102 per se.

In step S609, the relay station 102 retransmits the re-encapsulated MAC layer packets of the mobile stations to the base station 101 according to the specifications in the relay station mapping information transmitted by the base station 101.

In step S610, the base station 101 receives the re-encapsulated MAC layer packets of the mobile stations relayed by the relay station 102, and decapsulates them to recover them into the original MAC layer packets of the mobile stations.

Those skilled in the art can see that although steps S605 and S606 illustrate the processing of the mobile stations in two possible circumstances, the mobile stations 103-1, 103-2 and 103-3 cannot realize and do not need to realize which circumstance they are under. This is because the entire mapping information relaying process is the same as the relaying process of traffics, which is transparent to the mobile stations.

An embodiment according to the present invention depicted in FIG. 6 is an improvement based on the relay method in FIG. 4. The communications transportation between the base station 101 and the relay station 102 is realized by re-encapsulating the original MAC layer packets. When the base station downlink mapping information transmitted by the base station 101 does not include connection ID (CID) information, the mobile stations 103-1, 103-2 and 103-3 must receive all the MAC layer packets that can be received and select traffic data that belong thereto. Therefore, no matter in which relay scenario, the mobile stations 103-1, 103-2 and 103-3 may receive two same MAC layer packets, which will produce negative effects on the processing of the mobile stations. The relay method in FIG. 6 can solve said problem. According to said method, the control information in the relay station downlink mapping information must be detailed to the connection level, i.e. corresponding control information should be provided for different connections, respectively, such as modulation information.

Figure 7:
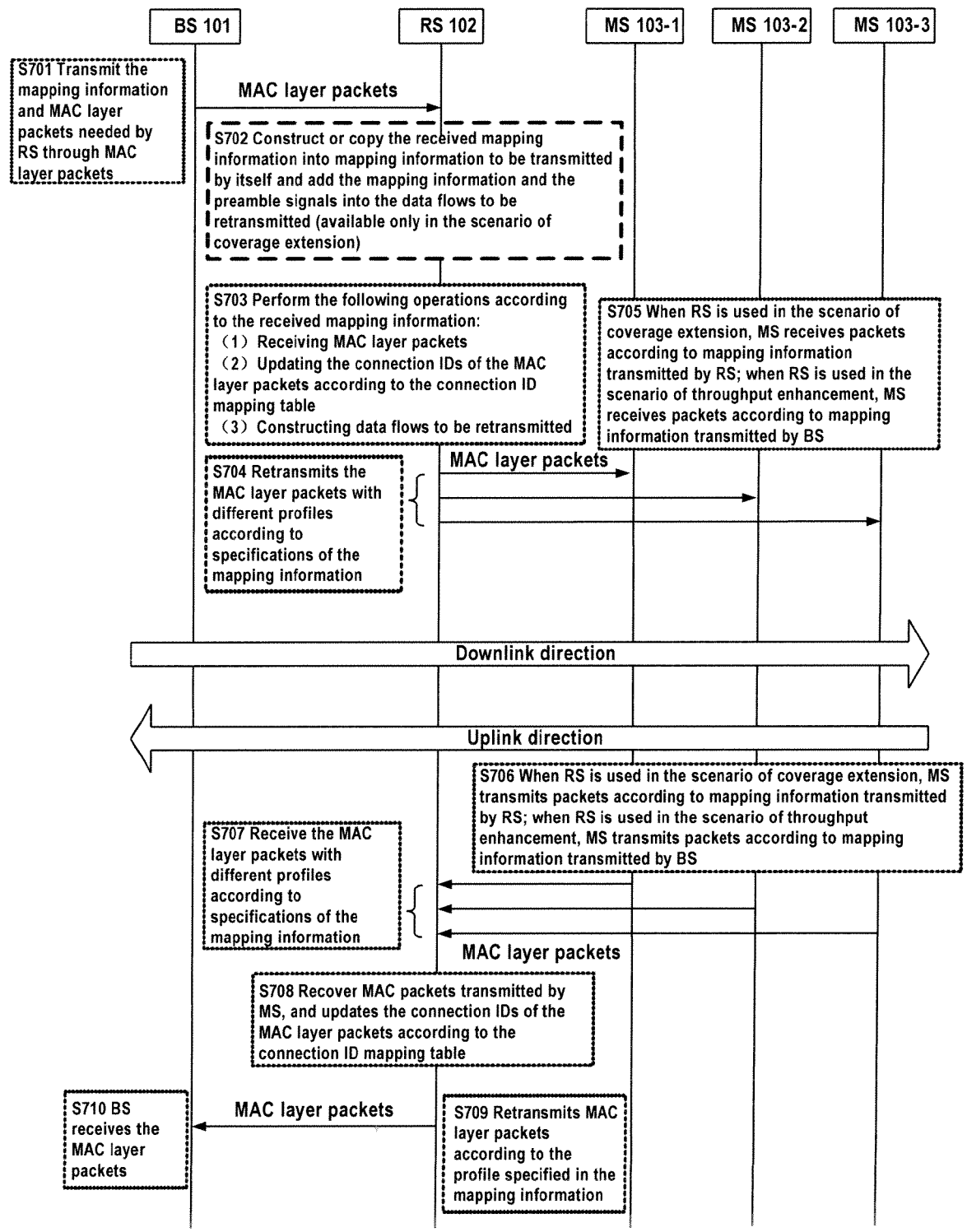
FIG. 7 shows a flow chart of a relay method of the wireless access system according to still another embodiment of the present invention.

FIG. 7 shows a flow chart of a relay method of the wireless access system according to still another embodiment of the present invention.

As shown in FIG. 7, in downlink direction, in step S701, the base station 101 transmits the control information needed by the relay station 102 through MAC layer packets, such as relay station mapping information, and MAC layer packets.

Step S702 is an alternative step. When the relay station 102 serves in the scenario of coverage extension, step S702 is performed. In step S702, the relay station 102 constructs or copies (depending on whether the formats of BS MAP and RS MAP are the same) the received mapping information into mapping information to be transmitted by itself so as to put said mapping information and the preamble signals into the data flows to be retransmitted in constructing the data flows to be retransmitted.

In step S703, the relay station 102 performs the following operations according to the relay station mapping information received from the base station 101: receiving MAC layer packets transmitted by the base station 101; updating the connection IDs of the MAC layer packets according to the connection ID (CID) mapping table; and constructing data flows to be retransmitted. Here, if the relay station 102 serves in the scenario of coverage extension, i.e. step S702 is performed preceding it, the mapping information and the preamble signals constructed or copied by the relay station 102 should be added to said retransmission constructed data flows. Wherein the connection ID mapping table is configured in advance, and the connection IDs of the MAC layer packets with respect to the base station 101 correspond to those with respect to the mobile stations 103-1, 103-2 and 103-3, respectively.

In step S704, the relay station 102 retransmits the MAC layer packets to be relayed to the mobile stations 103-1, 103-2 and 103-3 respectively, with different profiles according to the relay station mapping information received from the base station 101.

In step S705, the mobile stations 103-1, 103-2 and 103-3 receive packets relayed by the relay station 102. Wherein if the mobile stations 103-1, 103-2 and 103-3 are in the scenario of coverage extension, the mobile stations 103-1, 103-2 and 103-3 can only receive mapping information transmitted by the relay station 102, hence, receiving MAC layer packets according to the content of mapping information transmitted by the relay station 102. If the mobile stations 103-1, 103-2 and 103-3 are in the scenario of throughput enhancement, the mobile stations 103-1, 103-2 and 103-3 can only receive mapping information broadcast by the base station 101 (as stated above, the relay station 102 does not relay mapping information here), hence receiving MAC layer packets according to the content of mapping information transmitted by the base station 101.

In uplink direction, in step S706, the mobile stations 103-1, 103-2 and 103-3 transmit packets. Similarly, if the mobile stations 103-1, 103-2 and 103-3 are in the scenario of coverage extension, MAC layer packets are transmitted according to the content of mapping information transmitted by the relay station 102. If the mobile stations 103-1, 103-2 and 103-3 are in the scenario of throughput enhancement, MAC layer packets are transmitted according to the content of mapping information transmitted by the base station 101.

In step S707, the relay station 102 receives from the mobile stations 103-1, 103-2 and 103-3 MAC layer packets to be relayed with different profiles according to the specifications in the relay station mapping information transmitted by the base station 101.

In step S708, the relay station 102 recovers the MAC layer packets transmitted by the mobile stations, and updates the connection IDs of the MAC layer packets according to the connection ID mapping table.

In step S709, the relay station 102 retransmits MAC layer packets of the mobile stations to the base station 101 according to the specifications in the relay station mapping information transmitted by the base station 101, where the connection IDs of the MAC layer packets have been updated.

In step S710, the base station 101 receives the MAC layer packets relayed by the relay station 102.

Those skilled in the art can appreciate that although steps S705 and S706 illustrate the processing of the mobile stations in two possible circumstances, the mobile stations 103-1, 103-2 and 103-3 cannot realize and do not need to realize which circumstance they are under. This is because the entire mapping information relaying process is the same as the relaying process of traffics, which is transparent to the mobile stations.

An embodiment according to the present invention depicted in FIG. 7 is an improvement based on the relay method in FIG. 4. The relay method can solve the problem of the possible repetition of receiving MAC layer packets by the wireless communication terminals through translation and retransmission of connection IDs. In the method, there are two types of connection IDs, one for connection between the base station 101 and the relay station 102, and the other for the connection between the relay station 102 and the mobile stations 103-1, 103-2 and 103-3. The relay station 102 can record the corresponding relationship between these two types of connection IDs at the connection setup period. Similar to the relay method shown in FIG. 6, in order to effectively control the transmission, the control information in the relay station downlink mapping information must be detailed to the connection level, i.e. corresponding control information should be provided for different connections, respectively, such as modulation information.

Figure 8:
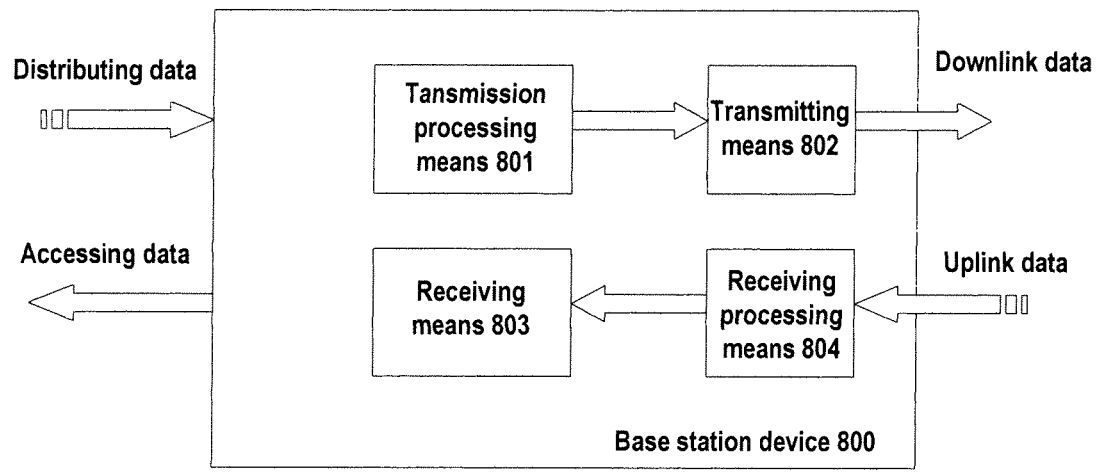
FIG. 8 schematically shows a base station device according to an embodiment of the present invention.

FIG. 8 schematically shows a base station device according to an embodiment of the present invention. The reference numeral 800 denotes a base station according to an embodiment of the present invention; the reference numeral 801 denotes transmission processing means 801 for processing data to be transmitted; the reference numeral 802 denotes transmitting means 802 for transmitting downlink data; the reference numeral 803 denotes receiving means 803 for receiving uplink data; and the reference numeral 804 denotes receiving processing means for processing the received data.

As shown in FIG. 8, data to be distributed from networks like a backbone network reach the base station 800. If the base station 800 decides that here communication with destined wireless communication devices such as the mobile stations should be carried out through the relay station, the relevant processing should be performed. At the transmitting end, the transmission processing means 801 can add the control information for controlling the operation of the relay station, such as relay station mapping information (RS MAP information) to the MAC layer packets to be transmitted. The transmission processing means 801 can further encapsulate the control information for controlling the operation of the relay station into individual MAC layer packets such that the transmitting means 802 transmits it through a special MAC layer data channel. According to an embodiment of the present invention, the transmission processing means 801 can also re-encapsulate the MAC layer packets to be transmitted, and the connection IDs used in the re-encapsulation are the connection IDs of the relay station. Then, the transmitting means 802 transmits the control information needed by the relay station 102 in MAC layer packets. Dependent on the transmission processing means 801, the control information may be transmitted as relay station mapping information, or transmitted as individual MAC layer packets through a specific MAC layer data channel. According to an embodiment of the present invention, the transmitting means 802 transmits downlink data in the form of MAC layer packets. According to another embodiment of the present invention, the transmitting means 802 transmits downlink data in the form of burst data flows.

At the receiving end, the receiving means 803 receives the uplink data relayed by the relay station. According to an embodiment of the present invention, the receiving means 803 receives the uplink data in the form of MAC layer packets. According to another embodiment of the present invention, the receiving means 803 receives the uplink data in the form of burst data flows. Alternatively, dependent on whether the transmitting end carries out re-encapsulation or not, the receiving processing means 804 may decapsulate the re-encapsulated MAC layer packets transmitted by the relay station, to recover the original MAC layer packets of the mobile stations.

Figure 9:
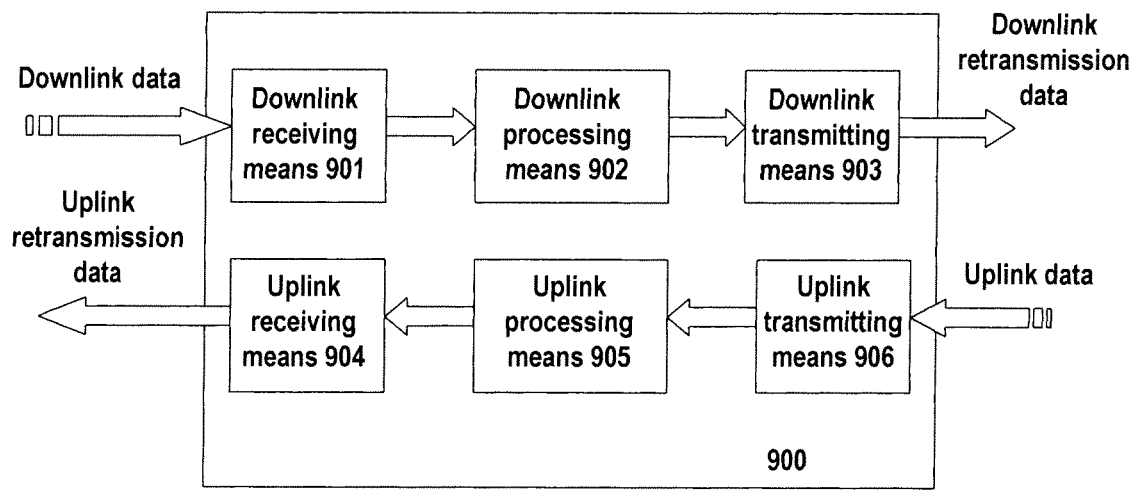
FIG. 9 schematically shows a relay device according to an embodiment of the present invention.

FIG. 9 schematically shows a relay device according to an embodiment of the present invention. The reference numeral 900 denotes a relay device according to an embodiment of the present invention; the reference numeral 901 denotes downlink receiving means for receiving downlink data transmitted by the base station; the reference numeral 902 denotes downlink processing means; the reference numeral 903 denotes downlink transmitting means for retransmitting downlink data to the wireless communication terminal; the reference numeral 904 denotes uplink receiving means for receiving uplink data from the wireless communication terminal; the reference numeral 905 denotes uplink processing means; and the reference numeral 906 denotes uplink transmitting means for retransmitting uplink data to the base station.

As shown in FIG. 9, in downlink direction, the downlink receiving means 901 in the relay device 900 receives the downlink data from the base station the form of MAC layer packets or burst data flows), which includes the control information for controlling the operation of the relay device 900. The downlink processing means 902 constructs data (in the form of MAC layer packets or burst data flows) to be retransmitted. When and only when the relay device serves in the scenario of coverage extension, the downlink processing means 902 constructs or copies (depending on whether the formats of BS MAP and RS MAP are the same) the received information, such as mapping information into the mapping information to be transmitted per se, and adds the mapping information and the preamble signals into the retransmission data flows in constructing the data flows to be retransmitted. According to an embodiment of the present invention, the downlink processing means 902 is further used for de-capsulation of the MAC layer packets marked by the connection ID of the relay device per se to recover the original MAC layer packets. According to an embodiment of the present invention, the downlink processing means 902 is further used for updating the connection IDs of the MAC layer packets according to the connection ID (CID) mapping table that is configured in advance. Then, the downlink transmitting means 903 retransmits the downlink data (in the form of MAC layer packets or burst data flows) with different profiles according to the control information, such as mapping information.

In uplink direction, the uplink receiving means 904 receives uplink data (in the form of MAC layer packets or burst data flows) of the wireless communication terminals with different profiles according to the specifications of the control information, such as mapping information. The uplink data processing means 905 recovers the uplink data (in the form of MAC layer packets or burst data flows) of the wireless communication terminals. According to an embodiment of the present invention, the uplink data processing means 905 re-encapsulate the uplink data with the connection ID of the relay device per se. According to another embodiment of the present invention, the uplink data processing means 905 updates the connection IDs of the MAC layer packets of the wireless communication terminals according to the connection ID mapping table. Then, the uplink transmitting means 906 transmits uplink data (in the form of MAC layer packets or burst data flows) of the wireless communication terminals with different profiles according to the specifications of the control information, such as mapping information.

According to the embodiments of the present invention, the base station device and the relay device have been depicted. Those skilled in the art can appreciate that for the purpose of convenience, the functions and features of the base station device and the relay station device (such as transmission-receiving antenna, power control module, etc.) that are known to those skilled in the art, while do not belong to the scope of the present invention, are omitted, and such omission will not render the present invention unclear.

The means shown in FIGS. 8 and 9 can be realized as individual function modules, or combined into one or a few function modules. Wherein the function modules can be realized completely by hardware, or completely by software, or by hardware and software together. According to an implementation, the processing described in the detail description can be stored in a readable storage medium of a computing device, it may be any device or medium that can store codes and/or data usable in a computer system, which includes and is not limited to application specific integrated circuit (ASIC), field programmable gate array (FPGA), semi-conductor storage, etc. According to an implementation, the aforesaid processing means can be realized by means for driving a conventional computer, or other processor means, such as microcontroller, field programmable gate array (FPGA), application specific integrated circuit (ASIC) or the combination thereof.

Although the embodiments of the present invention have been described with reference to the drawings, various variations or modifications can be made by those skilled in the art within the scope of the accompanying claims.

The invention claimed is:

1. A relay method in a wireless access system, the method comprising:

in a downlink direction, receiving downlink data from a base station at a relay station, wherein the downlink data include control information for relay operation;

constructing downlink data to be retransmitted;

retransmitting the constructed downlink data to wireless communication terminals according to a profile specified by the control information; and, in an uplink direction, receiving uplink data from the wireless communication terminals according to a profile specified by the control information;

recovering the uplink data of the wireless communication terminals; and retransmitting the uplink data to the base station according to the profile specified by the control information, wherein the control information comprises relay station downlink mapping information for controlling retransmission of downlink data by the relay station, and relay station uplink mapping information for controlling receiving of uplink data by the relay station.

2. The method according to claim 1, wherein the downlink data refer to MAC layer packets; and the uplink data refer to MAC layer packets.

3. The method according to claim 1, wherein the downlink data refer to burst data flows; and the uplink data refer to burst data flows.

4. The method according to claim 2, wherein the downlink MAC layer packets from the base station are MAC layer packets marked by a connection ID of the relay station, and the method further comprises:
in the downlink direction, decapsulating the MAC layer packets marked by the connection ID of the relay station; and
in the uplink direction, re-encapsulating the recovered uplink MAC layer packets with the connection ID of the relay station.

5. The method according to claim 4, further comprising:
in the uplink direction, the base station decapsulating the uplink MAC layer packets marked by the connection ID of the relay station to recover the original MAC layer packets.

6. The method according to claim 2, further comprising:
in the downlink direction, updating connection Ds of the downlink MAC layer packets into connection IDs thereof with respect to the wireless communication terminals according to a connection ID mapping table;
in the uplink direction, recovering connection IDs of the uplink MAC layer packets into connection IDs thereof with respect to the base station according to the connection ID mapping table;
wherein the connection ID mapping table is configured in advance, and the connection IDs of the MAC layer packets with respect to the base station correspond to the connection IDs thereof with respect to the wireless communication terminals, respectively.

7. The method according to claim 1, further comprising:
when the relay station serves in a scenario of coverage extension, constructing or copying the received relay station mapping information into mapping information to be transmitted to wireless communication terminals, and wherein the constructed downlink data comprises the mapping information and preamble signals to be transmitted to the wireless communication terminals.

8. A base station device, comprising:
a transmitter that is operative to transmit downlink data to a relay station;
a processor that is operative to control information for controlling the relay operation to downlink data to be transmitted; and
a receiver that is operative to receive uplink data retransmitted by the relay station, wherein the control information for relay operation comprises relay station mapping information, which includes relay station downlink mapping information for controlling the retransmission of downlink data by the relay station, and relay station uplink mapping information for controlling the receiving of uplink data by the relay station.

9. The base station device according to claim 8, wherein the downlink data refer to MAC layer packets; and the uplink data refer to MAC layer packets.

10. The base station device according to claim 8, wherein the downlink data refer to burst data flows; and the uplink data refer to burst data flows.

11. The base station device according to claim 9, wherein the processor is also operative to re-encapsulate the downlink MAC layer packets to be transmitted, and a connection ID used in the re-encapsulation comprises a connection ID of the relay station, and the base station device further includes:
a receiving processor that is operative to decapsulate the uplink MAC layer packets received by the receiver and marked by the connection ID of the relay station.

12. A relay device, comprising:
a downlink receiver that is operative to receive downlink data from a base station, wherein the downlink data include control information for relay operation;
a downlink processor that is operative to downlink data to be retransmitted;
a downlink transmitter that is operative to transmit the constructed downlink data to wireless communication terminals according to a profile specified by the control information;
an uplink receiver that is operative to receive uplink data from the wireless communication terminals according to a profile specified by the control information;
an uplink processor that is operative to uplink data of the wireless communication terminals; and
an uplink transmitter that is operative to retransmit uplink data to the base station according to the profile specified by the control information, wherein the control information for relay operation comprises relay station mapping information, which includes relay station downlink mapping information for controlling the retransmission of downlink data by the relay station, and relay station uplink mapping information for controlling the receiving of uplink data by the relay station.

13. The relay device according to claim 12, wherein the downlink data refer to MAC layer packets; and the uplink data refer to MAC layer packets.

14. The relay device according to claim 12, wherein the downlink data refer to burst data flows; and the uplink data refer to burst data flows.

15. The relay device according to claim 13, wherein the downlink MAC layer packets received by the downlink receiver are MAC layer packets marked by a connection ID of the relay station, and
wherein the downlink processor is further operative to decapsulate the MAC layer packets marked by the connection IDs of the relay station; and
the uplink processor is further operative to re-encapsulate the recovered uplink MAC layer packets with the connection IDs of the relay station.

16. The relay device according to claim 13, wherein
the downlink processor is further operative to update connection IDs of the downlink MAC layer packets into connection IDs thereof with respect to the wireless communication terminals according to a connection ID mapping table;
the uplink processor is further operative to recover the connection IDs of the uplink MAC layer packets into connection IDs thereof with respect to the base station according to the connection ID mapping table;
wherein the connection ID mapping table is configured in advance, and the connection IDs of the MAC layer packets with respect to the base station correspond to the connection IDs thereof with respect to the wireless communication terminals respectively.

17. The relay device according to claim 13, wherein when the relay station serves in the scenario of coverage extension, the downlink processor is further operative to construct or copy the received relay station mapping information into mapping information to be transmitted to wireless communication terminals, and the downlink packets constructed by the downlink processor include the mapping information and preamble signals to be transmitted to the wireless communication terminals.

18. A wireless relay system, comprising:
- a base station device comprising a transmitter that is operative to transmit downlink data to a relay station, a transmission processor that is operative to add control information for controlling the relay operation to downlink data to be transmitted, and a receiver that is operative to receive uplink data retransmitted by the relay station; and
- a relay device comprising a downlink receiver that is operative to receive downlink data from a base station, wherein the downlink data include control information for relay operation, a downlink processor that is operative to process downlink data to be retransmitted, a downlink transmitter that is operative to transmit the constructed downlink data to wireless communication terminals according to a profile specified by the control information, an uplink receiver that is operative to receive uplink data from the wireless communication terminals according to a profile specified by the control information, an uplink processor that is operative to process uplink data of the wireless communication terminals, and an uplink transmitter that is operative to retransmit uplink data to the base station according to the profile specified by the control information.

19. The system according to claim 18, wherein the downlink data comprises MAC layer packets marked by a connection ID of the relay station and the uplink data comprises MAC layer packets, and the downlink processor is further operative to decapsulate the MAC layer packets marked by the connection ID of the relay station and the uplink processor is further operative to re-encapsulate the recovered uplink MAC layer packets with the connection ID of the relay station.

* * * * *